United States Patent
Gong et al.

(10) Patent No.: US 11,261,509 B2
(45) Date of Patent: Mar. 1, 2022

(54) METAL LITHIUM STRIP, PRE-LITHIATED ELECTRODE PLATE, PRE-LITHIATION PROCESS, SECONDARY BATTERY, PREPARATION PROCESS OF THE SECONDARY BATTERY, AND APPARATUS

(71) Applicant: Contemporary Amperex Technology Co., Limited, Ningde (CN)

(72) Inventors: Zhijie Gong, Ningde (CN); Bin Xie, Ningde (CN); Shitong Chen, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/244,976

(22) Filed: Apr. 30, 2021

(65) Prior Publication Data

US 2021/0262066 A1 Aug. 26, 2021

Related U.S. Application Data

(63) Continuation of application No. PCT/CN2020/104525, filed on Jul. 24, 2020.

(30) Foreign Application Priority Data

Aug. 5, 2019 (CN) .......................... 201910715811.2

(51) Int. Cl.
*C22C 24/00* (2006.01)
*C21D 8/02* (2006.01)
(Continued)

(52) U.S. Cl.
CPC ............ *C22C 24/00* (2013.01); *C21D 8/0236* (2013.01); *H01M 4/0435* (2013.01);
(Continued)

(58) Field of Classification Search
None
See application file for complete search history.

(56) References Cited

U.S. PATENT DOCUMENTS

2010/0086833 A1 4/2010 Pozin et al.

FOREIGN PATENT DOCUMENTS

| CN | 104842626 A | 8/2015 |
|---|---|---|
| CN | 104868127 A | 8/2015 |

(Continued)

OTHER PUBLICATIONS

The First Office Action forChinese Application No. 201910715811.2, dated Jun. 28, 2021, 11 pages.

(Continued)

*Primary Examiner* — Jonathan Crepeau
*Assistant Examiner* — Angela J Martin
(74) *Attorney, Agent, or Firm* — Law Offices of Liaoteng Wang (57) ABSTRACT

The present embodiments provide a metal lithium strip, a prelithiated electrode plate, and a prelithiation process. The metal lithium strip comprises a lithium substrate and a metal element doped in the lithium substrate, the metal element comprises at least two of magnesium, boron, aluminum, silicon, indium, zinc, silver, calcium, manganese and sodium; and the metal lithium strip has a strength a, a width w, and a thickness h, satisfying: $\sigma^2-(w/105h)^2>0$. In the present application, the strength of the lithium strip is adjusted by the doping of the metal elements; meanwhile, the strength of the adjusted lithium strip is matched with its width and thickness ensuring that in the process of rolling the metal lithium strip to a reasonable thickness, the phenomenon of edge cracking of the lithium strip is avoided, (Continued)

lithium metal resources and production costs can be saved, a uniform pre-lithiation effect for electrode plate can also be achieved.

20 Claims, 3 Drawing Sheets

(51) Int. Cl.
    *H01M 4/36*     (2006.01)
    *H01M 4/38*     (2006.01)
    *H01M 10/0525*     (2010.01)
    *H01M 4/04*     (2006.01)
    *H01M 4/40*     (2006.01)
    *B21B 1/40*     (2006.01)

(52) U.S. Cl.
    CPC .......... *H01M 4/366* (2013.01); *H01M 4/382* (2013.01); *H01M 10/0525* (2013.01); *B21B 1/40* (2013.01); *H01M 4/405* (2013.01)

(56) References Cited

FOREIGN PATENT DOCUMENTS

| | | |
|---|---|---|
| CN | 105489846 A | 4/2016 |
| CN | 105755410 A | 7/2016 |
| CN | 106960945 A | 7/2017 |
| CN | 106981625 A | 7/2017 |
| CN | 107425175 A | 12/2017 |
| CN | 109244473 A | 1/2019 |
| CN | 109256548 A | 1/2019 |
| CN | 208385526 U | 1/2019 |
| CN | 109390548 A | 2/2019 |
| CN | 109390587 A | 2/2019 |
| CN | 209001017 U | 6/2019 |
| CN | 110010844 A | 7/2019 |
| JP | 2018130759 A | 8/2018 |

OTHER PUBLICATIONS

Wen Xu, "Constant Tension Rolling of Lithium Metal Strip", Journal of Xinjiang Vocational University, vol. 11, No. 3, dated Sep. 30, 2003, 3 pages.

PCT International Search Report for PCT/CN2020/104525, dated Oct. 22, 2020, 10 pages.

The Extended European Search Report for European Application No. 20850829.1, dated Dec. 3, 2021, 19 pages.

Anonymous: "Buy Lithium Foil 99.9% 0.1 micron | SMI Ltd.", dated Apr. 1, 2019, 1 page.

METAL LITHIUM STRIP, PRE-LITHIATED ELECTRODE PLATE, PRE-LITHIATION PROCESS, SECONDARY BATTERY, PREPARATION PROCESS OF THE SECONDARY BATTERY, AND APPARATUS

CROSS-REFERENCE TO RELATED APPLICATION

This application is a continuation of International Application No. PCT/CN2020/104525, filed on Jul. 24, 2020, which claims priority to Chinese Patent Application No. 201910715811.2 filed on Aug. 5, 2019, both of which are incorporated herein by reference in their entireties.

TECHNICAL FIELD

The present application relates to the technical field of battery and more particularly, to a metal lithium strip, a prelithiated electrode plate, a prelithiation process, a secondary battery and the preparation thereof and an apparatus.

BACKGROUND

With the rapid development of new energy electric vehicles, the demand for lithium-ion secondary batteries has also grown exponentially. However, the current energy density and battery cycle performance of lithium-ion batteries still cannot meet actual needs.

A pre-lithiation technology can not only make up for the first effect loss of anode, but also provide an additional lithium source, thereby greatly improving the energy density and cycle performance of lithium-ion batteries. In the existing pre-lithiation technology, the lithium powder is usually pressed on the surface of anode through a mold to achieve a pre-lithiation effect. However, in the production process with such a pre-lithiation process, it is easy to cause safety accidents due to active chemical properties of lithium powder, and the pre-lithiation process has high requirements on the environment of workshop. In order to improve safety of the pre-lithiation process, a lithium strip can be used for pre-lithiation. However, during the rolling process, edge of the lithium strip is prone to cracking, resulting in a shortage of material on the edge of the thinned lithium foil. When the lithium foil is compounded on anode, there will be the event that the edge of anode is not pre-lithiated, thereby resulting in uniform pre-lithiation.

SUMMARY

A first aspect of the present application provides a metal lithium strip, comprising a lithium substrate and a metal element doped in the lithium substrate, the metal element comprising at least two of magnesium, boron, aluminum, silicon, indium, zinc, silver, calcium, manganese and sodium; and the metal lithium strip has a strength a, a width w, and a thickness h, satisfying $\sigma^2-(w/105h)^2>0$.

It is surprisingly found that in the metal lithium strip provided by the present application, the lithium substrate is doped with at least two metal elements, and the strength of the lithium strip is adjusted by the doping of the metal elements; at the same time, the strength a of the adjusted lithium strip and its width w and thickness h meet: $\sigma^2-(w/105h)^2>0$, so as to realize the matching of the strength, thickness and width of the lithium strip, and ensure that in the process of rolling the metal lithium strip to a reasonable thickness with the conventional rolling mills, the phenomenon of edge cracking of the lithium strip is avoided, lithium metal resources and production costs can be saved, and also achieve a uniform pre-lithiation effect for electrode plate may be achieved.

According to any above-mentioned embodiments, the metal element comprises aluminum element and sodium element.

According to any above-mentioned embodiments, the aluminum element is present in the metal lithium strip in a mass percentage of 0.12% to 0.3%, and optionally, the aluminum element is present in the metal lithium strip in a mass percentage of 0.15%-0.25%.

According to any above-mentioned embodiments, the sodium element is present the metal lithium strip in a mass percentage of 0.03% to 0.08%.

According to any above-mentioned embodiments, the strength a of the metal lithium strip is from 1.23 Mpa to 2.25 Mpa.

According to any above-mentioned embodiments, the width w of the metal lithium strip is from 70 mm to 320 mm; optionally, the width w of the metal lithium strip is from 70 mm to 300 mm.

According to any above-mentioned embodiments, the thickness h of the metal lithium strip is from 1.0 mm to 2.0 mm; optionally, the thickness h of the metal lithium strip is from 1.2 mm~1.8 mm.

A second aspect of the present application provides a pre-lithiated electrode plate, wherein the pre-lithiated electrode plate comprises a lithium foil formed from the metal lithium strip according to the first aspect of the present application by rolling.

A third aspect of the present application provides a process for pre-lithiation, which comprises: forming a lithium foil from the metal lithium strip according to the first aspect of the present application by rolling; and compounding the lithium foil on the surface of an electrode plate to obtain the pre-lithiated electrode plate according to the second aspect of the present application.

According to any above-mentioned embodiments, the lithium foil has a thickness of 1 μm~20 μm; and the rolling has a rolling force of 1 T~7 T.

A fourth aspect of the present application provides a secondary battery, wherein the secondary battery comprises the pre-lithiated electrode plate according to the second aspect of the present application.

A fifth aspect of the present application provides a process for preparing a secondary battery, wherein the process for pre-lithiation according to the third aspect of the present application is used for pre-lithiation.

A sixth aspect of the present application provides an apparatus comprising the secondary battery according to the fourth aspect of the present application.

BRIEF DESCRIPTION OF DRAWINGS

The features, advantages, and technical effects of the exemplary embodiments of the present application will be described below with reference to the accompanying drawings.

In above figures, the reference numerals are defined as follows: 1—battery pack; 2—upper cabinet body; 3—lower cabinet body; 4—battery module; 5—secondary battery; 51—housing; 52—electrode assembly; and 53—cover.

DESCRIPTION OF EMBODIMENTS

Embodiments of the present application will be described in further detail below in conjunction with the accompanying drawings and examples. The detailed description and drawings of the following embodiments are used to exemplarily illustrate the principles of the present application, but cannot be used to limit the scope of the present application. That is to say, the present application is not limited to the described embodiments. For the sake of brevity, the present application explicitly describes some numerical ranges. However, any lower limit can be combined with any upper limit as an unspecified range; any lower limit can be combined with any other lower limit as an unspecified range, and any upper limit can be combined with any other upper limit as an unspecified range. Further, although not explicitly described, each point or single value between endpoints of a range is included in the range. Thus, each point or single value, as a lower limit or an upper limit, can be combined with any other point or single value or combined with any other lower or upper limit to form an unspecified range.

In the description herein, it should be noted that, unless otherwise stated, the recitation of numerical ranges by "above" and "below" include all numbers within that range including the endpoints. As used herein, "a", "an", "the", "at least one", and "one or more" are used interchangeably, unless indicated otherwise and the recitation of "more" in the phrase "one or more" includes two or more.

The above is not intended to describe all disclosed embodiments or implementations. The exemplary embodiments are described in details as below. Throughout the present application, a series of embodiments provide a guidance such that these embodiments can be used in various combinations. In the present application, merely the representative embodiments are presented and should not be construed as to be exhaustive.

The inventor of the present application proposes that in a pre-lithiation technology for an electrode plate, the problem of edge cracking of a lithium strip occurs during the rolling process of the lithium strip, which mainly results from a mismatch between the tensile strength of the lithium strip and the thickness and width of the lithium strip. Specifically, during the rolling process, a lithium strip with a certain tensile strength is subjected to unwinding tension. Under the action of tension, the lithium strip will undergo plastic deformation, that is, the lithium strip is stretched and its edge becomes thinner. When the edge becomes thinner, it is easy to form a fracture, and the phenomenon of edge cracking of the lithium strip occurs. In the process of continuous rolling of a lithium strip, the portions of the lithium strip with different thickness and width will subjected to different tension: the wider the width of the lithium strip portion, the greater the tension and the easier it is to crack the edges; the thicker the thickness of the lithium strip portion, the greater the unit strength of the lithium strip in the width direction, the less likely it is to crack the edges. However, the thicker the lithium strip is, the greater the required rolling force is, making it difficult to thin the lithium strip. Facing the above issue, the following methods are adopted, comprising rolling the lithium strip into a thicker lithium foil that is directly used for the pre-lithiation of electrode plate so that it will sacrifice the thinness requirements of the lithium foil for pre-lithiation; alternatively, firstly increasing the width of the lithium strip and rolling it into a lithium foil followed by trimming the lithium foil to remove irregular edges. However, both of these methods cause a waste of lithium resources and increase the cost of pre-lithiation of electrode plate.

It can be seen that during the rolling process of the lithium strip, the tensile strength of the lithium strip and the thickness and width of the lithium strip together affect the rolling effect when a roller press with the conventional rolling force is used for achieving a reasonable thickness.

In order to better understand the present application, the embodiments of the present application are described in connection with in conjunction with FIG. 1 to FIG. 8 as follows.

The metal lithium strip, pre-lithiated electrode plate, and pre-lithiation method of the present application are described in detail below:

In a first aspect of the present application, embodiments of the present application provide a metal lithium strip, comprising a lithium substrate and a metal element doped in the lithium substrate, the metal element comprising at least two of magnesium, boron, aluminum, silicon, indium, zinc, silver, calcium, manganese and sodium; and the metal lithium strip has a strength σ, a width w, and a thickness h, satisfying $\sigma^2-(w/105h)^2>0$.

In the embodiments of the present application, the strength, thickness, and width of the lithium strip are matched to solve the problem of edge cracking of the lithium strip during the rolling process. Specifically, during the rolling process, a lithium strip with a certain tensile strength is subjected to unwinding tension. Under the action of tension, the lithium strip will undergo plastic deformation, that is, the lithium strip is stretched and its edge becomes thinner. When the edge becomes thinner, it is easy to form a fracture, and the phenomenon of edge cracking of the lithium strip occurs. In the process of continuous rolling of a lithium strip, the portions of the lithium strip with different thickness and width will subjected to different tension; the wider the width of the lithium strip portion, the greater the tension and the easier it is to crack the edges; the thicker the thickness of the lithium strip portion, the greater the unit strength of the lithium strip in the width direction, the less likely it is to crack the edges. However, the lithium strip is thicker, the required rolling force will exceed the upper limit of the roller press, making it difficult to thin the lithium strip. In order to solve the above issue, in embodiment of the present application at least two metal elements are doped in the lithium substrate in which the strength of the lithium strip are adjusted through the doping of metal elements; at the same time, the strength a, width w, and thickness h of the metal strip are adjusted and controlled satisfying: $\sigma^2-(w/105h)^2>0$, so that the strength of the lithium strip and the thickness and width of the lithium strip will match, and the metal lithium strip of the present application can be rolled to a reasonable thickness by the conventional rolling force of the roller press while ensuring that there is no edge cracking of the lithium strip during the rolling process. It can not only save lithium metal resources and production costs, but also obtain a uniform pre-lithation effect.

In any of the foregoing embodiments of the present application, the metal element comprises aluminum element and sodium element.

The composite doping of aluminum and sodium in the metal lithium strip can make the lithium strip achieve better strength; and such a doping will not adversely affect performances of battery core since the battery core itself contains aluminum and sodium and the aluminum and sodium elements remain on the surface of the anode during the cycle process of the battery core. However, if the doping amount of aluminum and sodium is too high, the strength of the lithium strip will be too strong, which is not conducive to rolling it thin, and which will also cause effective pre-lithiation to be reduced. Therefore, it is necessary to reasonably control the doping amount of aluminum and sodium.

In any of the foregoing embodiments of the present application, the aluminum element is present in the metal lithium strip in a mass percentage of 0.12% to 0.3%; optionally, the aluminum element is present in the metal lithium strip in a mass percentage of 0.15%~0.25%.

The aluminum element can form an alloy with the lithium substrate to strengthen the process of solid solution. That is, aluminum atoms are solid-dissolved into the lithium lattice, causing lattice distortion, increasing the resistance to movement of dislocations, and improving the strength of the lithium strip. The higher the solid solubility of aluminum, the higher the strength of the lithium strip is. When the mass percentage of aluminum in the metal lithium strip is less than 0.12%, the strength of the lithium strip is not significantly improved; and when the mass percentage of aluminum in the metal lithium strip is greater than 0.3%, it will cause effective pre-lithiation to be decreased and is not conducive to the optimization of battery core performance.

In any of the foregoing embodiments of the present application, the sodium element is present in the metal lithium strip in a mass percentage of 0.03% to 0.08%.

The sodium element exists in the lithium substrate as an elemental substance, which functions as dispersion strengthening. That is, the metal sodium is dispersed in the lithium matrix in the form of a second phase, and the dislocation line cannot directly pass through the sodium particles, and will form a dislocation loop around the particles. The bending of the dislocation line will increase the lattice distortion energy of the dislocation-affected zone, increase the resistance to the movement of dislocation, and thus increase the strength of the lithium strip. The more sodium element, the higher the strength of the lithium strip is. Due to the better dispersion strengthening effect, the required sodium content is also lower. When the mass percentage of sodium in the metal lithium strip is less than 0.03%, the strength of the lithium strip is not significantly improved; and when the mass percentage of sodium in the metal lithium strip is greater than 0.08%, it is not conducive to production safety because the sodium element can react with air and generates heat, causing the heating temperature of the pre-lithiated anode upon winding to be too high.

In any of the foregoing embodiments of the present application, the metal lithium strip has a strength a of 1.23 Mpa to 2.25 Mpa.

The increase in the strength of the metal lithium strip can help reduce the occurrence of edge cracking of the lithium strip during the rolling process. However, if the strength of the lithium strip is too high, it is not conducive to rolling it to a reasonable thickness through the conventional rolling force of the roller press. Thus, the strength of the metal lithium strip in the present application is preferably from 1.23 Mpa to 2.25 Mpa.

In any of the foregoing embodiments of the present application, the metal lithium strip has a width w of 70 mm to 320 mm; optionally, the width w of the metal lithium strip is from 70 mm to 300 mm.

The smaller the width of the metal lithium strip, the less likely it is to crack edges during the rolling process; the larger the width of the metal lithium strip, the more likely it is to crack edges during the rolling process. However, the metal lithium strip shall be selected according to the width of the electrode plate, so the dual issues of lithium strip cracking and matching with the electrode plate are comprehensively considered. According to the strength range of the metal lithium strip in the present application, the width w ranges from 70 mm to 320 mm, optionally 70 mm to 300 mm.

In any of the foregoing embodiments of the present application, the metal lithium strip has a thickness h of 1.0 mm to 2.0 mm; optionally, the thickness h of the metal lithium strip is from 1.2 mm to 1.8 mm.

The smaller the thickness of the metal lithium strip, the easier it can be rolled to a thinner thickness, but the possibility of edge cracking during the rolling process will increase; the greater the thickness of the metal lithium strip, the more difficult it is for the lithium strip to crack the edges during the rolling process. At the same time, a greater rolling force is required to roll the strip thinner, and it is not easy to roll the strip to the thinnest. According to the conventional rolling force of the roller press and the reasonable thickness of the rolled lithium foil, the thickness h of the lithium metal strip of the present application ranges from 1.0 mm to 2.0 mm. Optionally, the thickness h of the lithium metal strip is in the range of 1.2 mm~1.8 mm.

In a second aspect of the present application, a pre-lithiated electrode plate is provided. The pre-lithiated electrode plate comprises a lithium foil formed from the metal lithium strip according to the first aspect of the present application by rolling.

In the above-mentioned pre-lithiated electrode plate, the lithium foil can be compounded on at least one surface of the electrode plate, and the electrode plate may be a negative electrode plate or a positive electrode plate.

In a third aspect of the present application, a process for pre-lithiation is provided, which comprises: forming a lithium foil from the metal lithium strip according to the first aspect of the present application by rolling; and compounding the lithium foil with an electrode plate to obtain a pre-lithiated electrode plate.

In any of the foregoing embodiments of the present application, the lithium foil has a thickness of 1 μm~20 μm; the rolling has a rolling force of 1T~7T.

In a fourth aspect of the present application, a secondary battery is provided, wherein the secondary battery comprises the pre-lithiated electrode plate according to the second aspect of the present application.

In the secondary battery of the fourth aspect of the present application, specifically, the secondary battery comprises a positive electrode plate, a negative electrode plate, a separator, and an electrolyte. The lithium foil formed from the metal lithium strip of the first aspect of the present application by rolling is compound on at least one surface of the electrode plate of the secondary battery, the electrode plate may be a negative electrode plate or a positive electrode plate. During the charging and discharging process of the battery, active ions are inserted and extracted back and forth between the positive electrode plate and the negative electrode plate. The electrolyte conducts ions between the positive electrode plate and the negative electrode plate.

Figure 3:
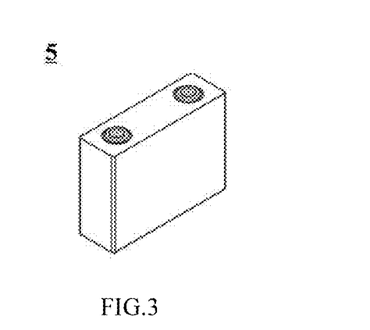
FIG. 3 is a schematic diagram of a battery according to an embodiment of the present application.

The present application has no particular limitation on the shape of the secondary battery, which can be cylindrical, square or other arbitrary shapes. FIG. 3 shows a battery 5 with a rectangular structure as an example.

Figure 4:
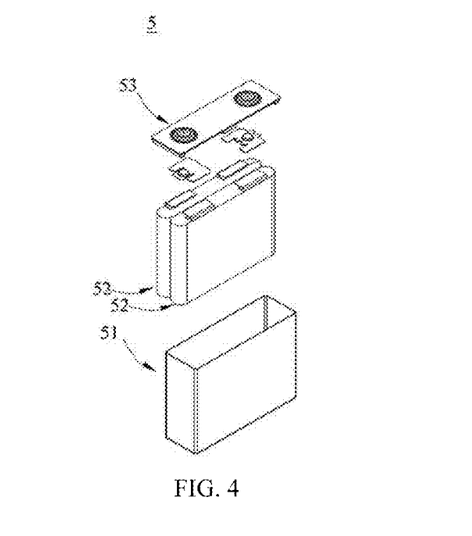
FIG. 4 is an exploded view of FIG. 3.

In some embodiments, referring to FIG. 4, the outer package may include a housing 51 and a cover 53 in which the housing 51 may include a bottom plate and side plates connected to the bottom plate, and the bottom plate and the side plates are enclosed to form an accommodating cavity. The housing 51 has an opening communicating with the accommodating cavity, and the cover plate 53 can cover the opening to close the accommodating cavity. The positive electrode plate, the negative electrode plate, and the separator may be stacked or wounded into a battery component 52. The battery component 52 is encapsulated in the accommodating cavity and is immersed by an electrolyte. The number of battery component 52 contained in the battery 5 can be one or more, which can be adjusted according to requirements.

In embodiments of the present application, a battery module is provided. The battery module may be assembled from the secondary battery according to above-mentioned fourth aspect of the present application and the battery module include a plurality of batteries, and the specific number of battery can be adjusted according to the application and capacity of the battery module.

Figure 5:
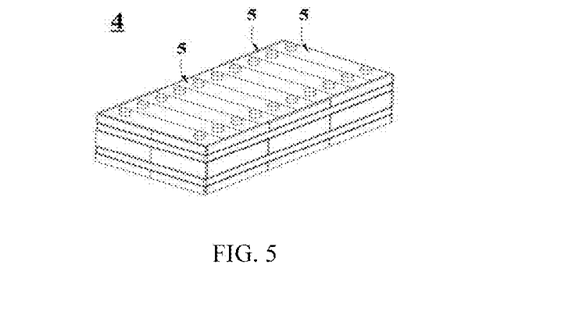
FIG. 5 is a schematic diagram of a battery module according to an embodiment of the present application.

FIG. 5 illustrates a battery module 4 as an example. Referring to FIG. 5, in the battery module 4, a plurality of batteries 5 are sequentially arranged along a length direction of the battery module 4. It is also possible that a plurality of batteries 5 are arranged in any other manner. Further, a plurality of batteries 5 can be fixed by a fastener.

Optionally, the battery module 4 may further include a housing having a receiving space, in which a plurality of batteries 5 are received.

In embodiments of the present application, a battery pack is provided. The above battery module provided by embodiments of the present application can also be assembled into a battery pack, and the number of battery modules included in the battery pack can be adjusted according to the application and capacity of the battery pack.

Figure 6:
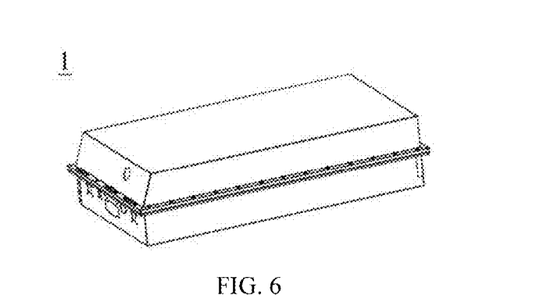
FIG. 6 is a schematic diagram of a battery pack according to an embodiment of the present application.
Figure 7:
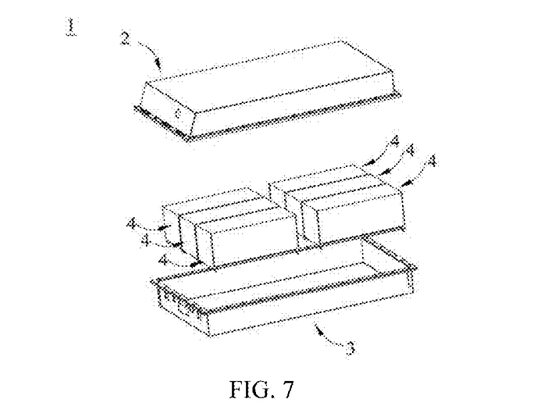
FIG. 7 is an exploded view of FIG. 6.

FIG. 6 and FIG. 7 illustrate a battery pack 1 as an example. With reference to FIG. 6 and FIG. 7, the battery pack 1 may include a battery box and a plurality of battery modules 4 provided in the battery box. The battery box includes an upper box 2 and a lower box 3 and the upper box 2 is arranged to cover the lower box 3, so as to form a closed space for receiving the battery modules 4. A plurality of battery modules 4 can be arranged in the battery box in any manner.

In a fifth aspect of the present application, a process for preparing a secondary battery is provided, wherein the process for pre-lithiation according to the third aspect of the present application is used for pre-lithiation.

In a sixth aspect of the present application, an apparatus is provided, the apparatus including at least one of the secondary battery, battery module or battery pack according to embodiments of the present application. The secondary battery, battery module or battery pack may be used as a power source of the apparatus or as an energy storage unit of the apparatus. The apparatus may be, but is not limited to, a mobile apparatus (such as a mobile phone, a notebook computer, and the like), an electric vehicle (such as a pure electric vehicle, a hybrid electric vehicle, a plug-in hybrid electric vehicle, an electric bicycle, an electric scooter, and an electric golf vehicles, electric trucks, and the like), electric trains, ships and satellites, energy storage systems, or the like.

The apparatus can adopt a secondary battery, a battery module, or a battery pack, according to application requirements.

Figure 8:
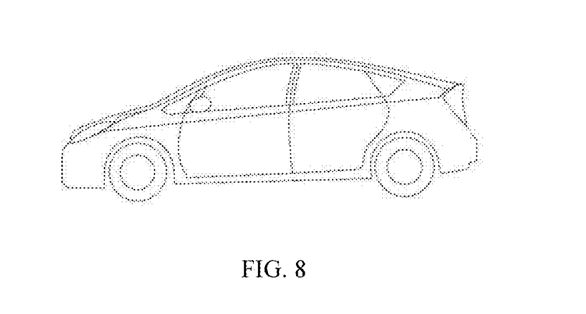
FIG. 8 is a schematic diagram of an apparatus according to an embodiment of the present application.

FIG. 8 illustrates an apparatus as an example. The apparatus is a pure electric vehicle, a hybrid electric vehicle, or a plug-in hybrid electric vehicle. In order to meet the requirements of the apparatus on high power and high energy density of device secondary battery, a battery pack or a battery module can be used.

As another example, the apparatus may be a mobile phone, a tablet computer, a notebook computer, and the like. The apparatus is generally required to be thin and light, and a secibdart battery can be used as a power source.

The application will be further elaborated below in conjunction with specific embodiments. It should be understood that these embodiments are only used to illustrate the application and not to limit the scope of the application.

Preparation of metal lithium strips of Examples 1 to 14 and Comparative Examples Crude lithium ingot raw materials were melted in a chemical material melting furnace, and then were distilled under the vacuum condition. The distillation temperature was controlled to vaporize elemental lithium and the vaporized elemental lithium was condensed into a liquid state. Then a certain proportion of metal elements was added into the chemical material melting furnace according to the parameters in Table 1, which was melt and mix together in the chemical melting furnace. Then the resulting mixture was filtered through a screen and poured into a cylindrical mold to cool and shape. Then, the shaped high-purity lithium ingot was put into an extrusion-type slit coating head, and the lithium was extruded from the coating head into a continuous strip by pressure, and then collected into a roll. By controlling the width and thickness of the slit, the width W and the thickness h of the produced lithium strip was controlled to obtain the lithium strips of Examples 1-14 and Comparative Examples.

Method for pre-lithiation of electrode plate in Examples 1-14 and Comparative Example 1-2

Using a four-roll continuous cold rolling method, the rolling pressure was 1T~7T, the lithium metal strip was rolled into a lithium foil with a thickness of 1 μm~20 μm, and the lithium foil and electrode plate were passed through a two-roll continuous cold rolling machine with a pressure of 1 T~7 T, so that the lithium foil was laminated with the electrode plate to obtain a pre-lithiated electrode plate.

The following tests were carried out on the metal lithium strip and the pre-lithiated electrode plate:

(1) Composition test

An inductively coupled plasma spectrometer (ICP) was used to test the element mass content of Li, Al, and Na contained in the metal lithium strip. The test was performed 4 times and the average value was taken.

(2) Strength test

The metal lithium strip was cut into a 20 mm×100 mm lithium bar, which bar was tested by a high-speed rail tensile machine at a tensile speed of 50 mm/min until the lithium bar was broken. The maximum tensile strength of the tensile machine during the test was the strength of the lithium strip, which was tested 4 times and the average value was taken.

(3) Thickness test

Using a micrometer, the thickness of the lithium strip was measured at 10 points along the width direction of the metal lithium strip, and the average value was taken.

(4) Width test

Using a meter ruler, the width of the lithium strip was measured, which was measured 3 times, and the average value was taken.

(5) Number of cracks on the edge of lithium strip

A 1000 m lithium foil was rolled, and the rolled lithium foil was measured for its width change with a meter ruler. When there was a width change of greater than 3 mm, one lithium strip cracking was recorded.

(6) Rollable thinnest thickness

The thickness of the lithium foil was tested at 10 points and the average value was taken.

(7) Heating test

The heating temperature produced by the pre-lithiated negative electrode plate during the winding process was measured with a thermocouple thermometer in a constant temperature and humidity drying room. The temperature of the drying room was 20° C. and the humidity was 2%. The test process was as follows: during the winding process of the pre-lithiated anode electrode plate, a temperature sensing line was put therein to detect the temperature change in the middle of the coil.

The specific parameters and test results of Examples 1-14 and Comparative Examples 1-2 was shown in Table 1 below.

Examples 1 to 5 so as to discuss the influence of the change in the aluminum element content; the aluminum content remained unchanged in Examples 3, and 6-7 so as to discuss the influence of the sodium content change; and in the comparative example 2 only Aluminum element was added, but no sodium element was added.

First, in Comparative Example 1, no metal elements were added, the strength of the lithium strip was low, only was 0.95 MPa, and the problem of edge cracking of the lithium strip during use was serious. In Comparative Example 2, only aluminum was added, and no sodium was added so that the increase in the strength of the lithium strip was not obvious, and the number of edge cracks was still very large. The above results showed that the addition of a single aluminum element did not meet the strength requirements of the lithium strip well, and a composite addition of aluminum element and sodium element was required.

Secondly, in Examples 1 to 5, the content of sodium element in the lithium strip remained unchanged. As the content of aluminum increased, the strength of the lithium strip also increased; when the width and thickness of the lithium strip were kept within a reasonable range, the increase in the strength of the lithium strip led to a significant reduction in the number of edge cracks. For example, in Example 5, the number of edge cracks had been reduced to 0. In Examples 3, 6, and 7, the content of aluminum was unchanged. With the increase of the content of sodium, the strength of the lithium strip was also increased significantly;

TABLE 1

Specific parameters and test results of Examples and Comparative Examples

| | Al Content (%) | Na Content (%) | $\sigma$ (Mpa) | Width (mm) | Thickness (mm) | $\sigma^2$- (w/105 h)$^2$ | Number of cracks on the edge of lithium strip | Rollable thinnest thickness (μm) | Heating temperature during winding (° C.) |
|---|---|---|---|---|---|---|---|---|---|
| Ex.1 | 0.12 | 0.03 | 1.23 | 185 | 1.605 | 0.31 | 15 times/1000 m | 2 | 30 |
| Ex.2 | 0.15 | 0.03 | 1.32 | 185 | 1.612 | 0.55 | 8 times/1000 m | 2 | 30 |
| Ex.3 | 0.2 | 0.03 | 1.54 | 185 | 1.596 | 1.15 | 5 times/1000 m | 2 | 30 |
| Ex.4 | 0.25 | 0.03 | 1.67 | 185 | 1.610 | 1.59 | 3 times/1000 m | 3 | 30 |
| Ex.5 | 0.3 | 0.03 | 1.94 | 185 | 1.608 | 2.56 | 0 times/1000 m | 4 | 30 |
| Ex.6 | 0.2 | 0.05 | 1.91 | 185 | 1.614 | 2.46 | 0 times/1000 m | 4 | 35 |
| Ex.7 | 0.2 | 0.08 | 2.25 | 185 | 1.593 | 3.84 | 0 times/1000 m | 6 | 40 |
| Ex.8 | 0.2 | 0.05 | 1.91 | 70 | 1.602 | 3.47 | 0 times/1000 m | 2 | 35 |
| Ex.9 | 0.2 | 0.05 | 1.91 | 300 | 1.611 | 0.50 | 10 times/1000 m | 3 | 35 |
| Ex.10 | 0.2 | 0.05 | 1.91 | 320 | 1.608 | 0.06 | 20 times/1000 m | 3 | 35 |
| Ex.11 | 0.2 | 0.05 | 1.91 | 185 | 1.004 | 0.57 | 7 times/1000 m | 1 | 35 |
| Ex.12 | 0.2 | 0.05 | 1.91 | 185 | 1.209 | 1.52 | 2 times/1000 m | 2 | 35 |
| Ex.13 | 0.2 | 0.05 | 1.91 | 185 | 1.815 | 2.71 | 0 times/1000 m | 3 | 35 |
| Ex.14 | 0.2 | 0.05 | 1.91 | 185 | 2.018 | 2.89 | 0 times/1000 m | 4 | 35 |
| CEx.1 | / | / | 0.95 | 185 | 1.592 | −0.32 | 250 times/1000 m | 1 | 25 |
| CEx.2 | 0.3 | / | 1.05 | 185 | 1.592 | −0.12 | 100 times/1000 m | 2 | 25 |

Figure 1:
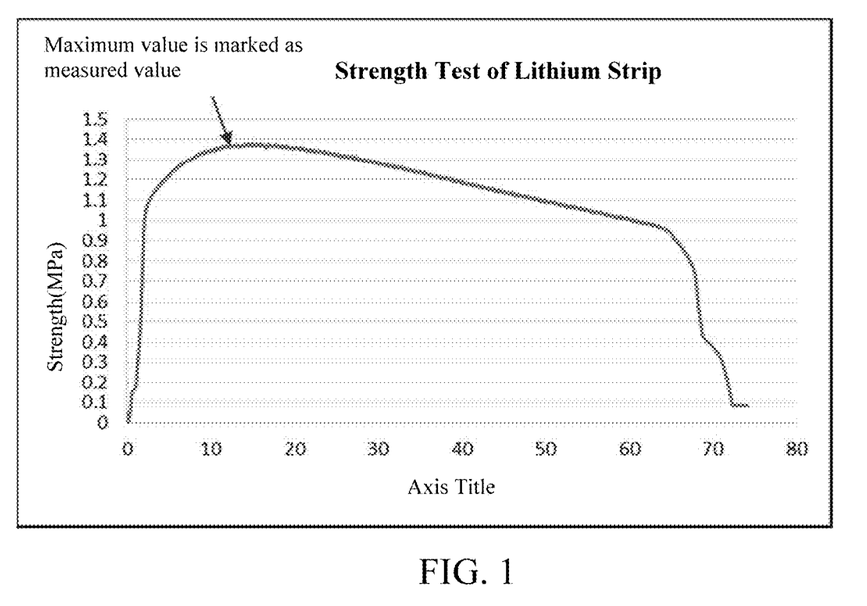
FIG. 1 is a diagram showing the strength test result of the metal lithium strip according to Example 2.
Figure 2:
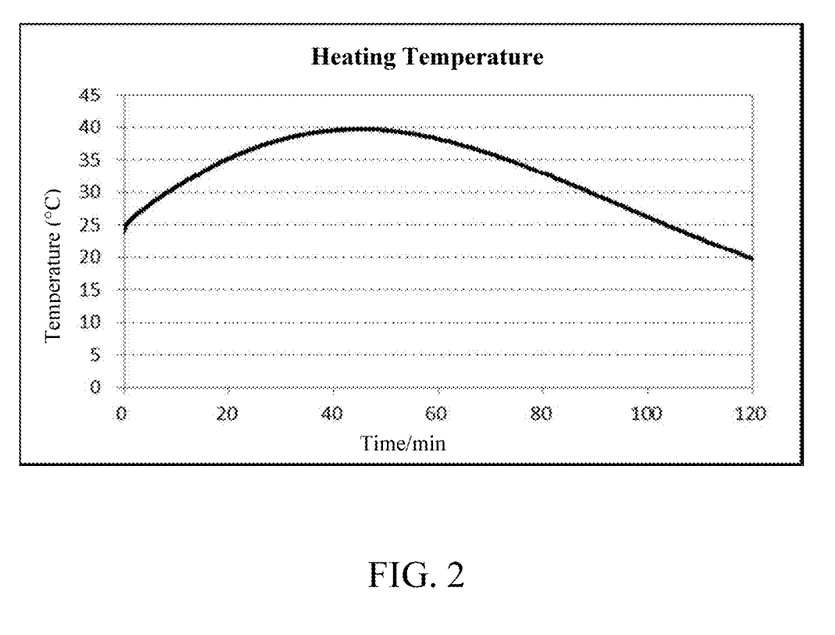
FIG. 2 is a curve graph showing the highest heating temperature of pre-lithiated anode during the winding process according to Example 7.

FIG. 1 is a diagram showing the strength test result of the metal lithium strip according to Example 2;

FIG. 2 is a curve graph showing the highest heating temperature of pre-lithiated anode during the winding process according to Example 7.

The data in Table 1 shows the effect of the specific parameters in the embodiments of the present application on the performances of the metal lithium strip and the pre-lithiated electrode plate.

Examples 1-7 and comparative examples show the effect of the doped metal elements in the lithium strip and its content change on the edge cracking of the lithium strip and on the performance of the pre-lithiated electrode plate. Among them, the sodium content remained unchanged in when the width and thickness of the lithium strip were kept within a reasonable range, the number of edge cracks of the lithium strip was also significantly reduced. For example, the number of edge cracks in Examples 6 and 7 was also 0. In addition, since sodium could react with air to release heat, an increase in the heating temperature of the pre-lithiated electrode plate upon winding would also be accompanied by the increase in sodium content; in Example 7, when the sodium content was increased to 0.08%, the highest heating temperature had risen to 40° C.

In summary, a composite addition of aluminum and sodium to the lithium strip could increase the strength of the lithium strip and reduce the number of edge cracks of the lithium strip during the rolling process. If the doping amount of aluminum and sodium was too low, the effect of increasing the strength of the lithium strip was not obvious; if the doping amount of aluminum and sodium was too high, the strength of the lithium strip will be too strong, which is not conducive to rolling it thin, and which will also cause the effective pre-lithiation to be reduced. In addition, for the consideration of production safety, the content of sodium in the metal lithium strip should not be too high. Therefore, in the embodiment of the present application, the mass percentage of aluminum in the metal lithium strip was 0.12% to 0.3%, optionally 0.15% to 0.25%; the mass percentage of sodium in the metal lithium strip was 0.03%-0.08%. By reasonably controlling the doping content of aluminum and sodium, the strength of the doped lithium strip with a metal element composite was in the range of 1.23 Mpa-2.25 Mpa, and the thinnest thickness of the lithium strip to which it can be rolled was also within a more suitable range.

It is worth noting that although the present application only provides examples of doping the lithium strip with aluminum and sodium, the lithium strip doped with at least two of magnesium, boron, silicon, indium, zinc, silver, calcium, and manganese element can also adjust the strength of the lithium strip, so that the strength of the lithium strip matches the thickness and width of the lithium strip, and the expected technical effect of the application may achieve.

Examples 6 and 8 to 14 showed the effect of the width and thickness changes of the lithium strip on the edge cracks of the lithium strip and on the performance of the pre-lithiated electrode plate. In Examples 6, 8 to 14, the added content of aluminum element and sodium element are the same, so the strength of the resulting lithium strips are also the same.

In the case where the strength of the lithium strip remained the same as in Example 6, the width of the lithium strip was changed in Examples 8-10. As in Example 8, the smaller the width of the lithium strip, the less likely it was to crack edges during the rolling process; as in Example 10, the larger the width of the lithium strip, the more likely it was to crack edges during the rolling process. When the width of the lithium strip was increased to 320 mm, the number of edge cracks reached 20 times. According to the strength range of the lithium metal strip in the present application, the reasonable range of the width w of the metal lithium strip was 70 mm to 320 mm; optionally, the reasonable range of the width w of the metal lithium strip was 70 mm to 300 mm.

The strength of the lithium strip and the width of the lithium strip in Examples 11 to 14 remained the same as those in Example 6 with the only exception that the thickness of the lithium strip was changed. As in Example 11 and Example 12, the smaller the thickness of the lithium strip, the easier it was rolled to a thinner thickness, but the possibility of edge cracking during the rolling process would increase. As in Example 13 and Example 14, the greater the thickness of the lithium strip, the less likely it was to crack the edges during the rolling process. However, as in Example 14, the thickness of the lithium strip is so large that it is difficult to roll it to the thinnest. According to the conventional rolling force of the roller press and the reasonable thickness of the rolled lithium foil, the thickness h of the lithium metal strip of the present application ranges from 1.0 mm to 2.0 mm; optionally, the thickness h of the lithium metal strip of the present application is in the range of 1.2 mm~1.8 mm.

Based on the application and teaching of the foregoing specification, those skilled in the art can also make changes and modifications to the foregoing embodiments. Therefore, the present application is not limited to the specific embodiments disclosed and described above, and some modifications and changes to the present application should also fall within the protection scope of the claims of the present application. In addition, although some specific terms are used in the present specification, these terms are only for convenience of description and do not constitute any limitation to the present application.

What is claimed is:

1. A metal lithium strip, comprising a lithium substrate and a metal element doped in the lithium substrate, the metal element comprising at least two of magnesium, boron, aluminum, silicon, indium, zinc, silver, calcium, manganese and sodium; and the metal lithium strip has a strength $\sigma$ (Mpa), a width w (mm), and a thickness h (mm), which satisfy: $\sigma^2 - (w/105h)^2 > 0$.

2. The metal lithium strip according to claim 1, wherein the metal element comprises aluminum element and sodium element.

3. The metal lithium strip according to claim 2, wherein the aluminum element is present in the metal lithium strip in a mass percentage of 0.12% to 0.3%, and optionally, the aluminum element is present in the metal lithium strip in a mass percentage of 0.15%-0.25%.

4. The metal lithium strip according to claim 2, wherein the sodium element is present the metal lithium strip in a mass percentage of 0.03% to 0.08%.

5. The metal lithium strip according to claim 3, wherein the sodium element is present the metal lithium strip in a mass percentage of 0.03% to 0.08%.

6. The metal lithium strip according to claim 1, wherein the strength $\sigma$ of the metal lithium strip is 1.23 Mpa to 2.25 Mpa.

7. The metal lithium strip according to claim 2, wherein the strength $\sigma$ of the metal lithium strip is 1.23 Mpa to 2.25 Mpa.

8. The metal lithium strip according to claim 3, wherein the strength $\sigma$ of the metal lithium strip is 1.23 Mpa to 2.25 Mpa.

9. The metal lithium strip according to claim 4, wherein the strength $\sigma$ of the metal lithium strip is 1.23 Mpa to 2.25 Mpa.

10. The metal lithium strip according to claim 1, wherein the width w of the metal lithium strip is 70 mm to 320 mm; optionally, the width w of the metal lithium strip is 70 mm to 300 mm.

11. The metal lithium strip according to claim 2, wherein the width w of the metal lithium strip is 70 mm to 320 mm; optionally, the width w of the metal lithium strip is 70 mm to 300 mm.

12. The metal lithium strip according to claim 3, wherein the width w of the metal lithium strip is 70 mm to 320 mm; optionally, the width w of the metal lithium strip is 70 mm to 300 mm.

13. The metal lithium strip according to claim 4, wherein the width w of the metal lithium strip is 70 mm to 320 mm; optionally, the width w of the metal lithium strip is 70 mm to 300 mm.

14. The metal lithium strip according to claim 6, wherein the width w of the metal lithium strip is 70 mm to 320 mm; optionally, the width w of the metal lithium strip is 70 mm to 300 mm.

15. The metal lithium strip according to claim 1, wherein the thickness h of the metal lithium strip is 1.0 mm to 2.0 mm; optionally, the thickness h of the metal lithium strip is 1.2 mm~1.8 mm.

16. The metal lithium strip according to claim 6, wherein the thickness h of the metal lithium strip is 1.0 mm to 2.0 mm; optionally, the thickness h of the metal lithium strip is 1.2 mm~1.8 mm.

17. The metal lithium strip according to claim 10, wherein the thickness h of the metal lithium strip is 1.0 mm to 2.0 mm; optionally, the thickness h of the metal lithium strip is 1.2 mm~1.8 mm.

18. A pre-lithiated electrode plate, wherein the pre-lithiated electrode plate comprises a lithium foil formed from the metal lithium strip according to claim 1 by rolling.

19. A process for pre-lithiation, which comprises:
forming a lithium foil from the metal lithium strip of claim1 by rolling; and
compounding the lithium foil with an electrode plate to obtain a pre-lithiated electrode plate.

20. The process for pre-lithiation according to claim 19, wherein the lithium foil has a thickness of 1 µm~20 µm; and the rolling has a rolling force of 1T~7T.

* * * * *